(12) United States Patent
Lee et al.

(10) Patent No.: US 11,577,855 B2
(45) Date of Patent: Feb. 14, 2023

(54) FLIGHT EQUIPMENT, FLIGHT SYSTEM AND INFORMATION PROCESSING APPARATUS

(71) Applicant: Rakuten Group, Inc., Tokyo (JP)

(72) Inventors: Kenichi Lee, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 372 days.

(21) Appl. No.: 16/753,065

(22) PCT Filed: Dec. 21, 2018

(86) PCT No.: PCT/JP2018/047365
§ 371 (c)(1),
(2) Date: Apr. 2, 2020

(87) PCT Pub. No.: WO2020/129254
PCT Pub. Date: Jun. 25, 2020

(65) Prior Publication Data
US 2021/0371122 A1 Dec. 2, 2021

(51) Int. Cl.
*B64D 45/00* (2006.01)
*B64C 27/20* (2006.01)
(Continued)

(52) U.S. Cl.
CPC .............. *B64D 45/00* (2013.01); *B64C 27/20* (2013.01); *B64C 39/024* (2013.01);
(Continued)

(58) Field of Classification Search
CPC ....................... B64D 45/00; B64D 2045/0085; B64C 27/20; B64C 39/024; B64C 2201/08;
(Continued)

(56) References Cited

U.S. PATENT DOCUMENTS 9,613,539 B1 * 4/2017 Lindskog ............. G08G 5/0056
10,131,419 B2 * 11/2018 Baird ...................... B64C 25/00
(Continued)

FOREIGN PATENT DOCUMENTS

EP         3239048 A1    11/2017
JP      2008-155663 A     7/2008
(Continued)

OTHER PUBLICATIONS

Communication dated Sep. 11, 2020, from the European Patent Office in European Application No. EP18934527.5.
(Continued)

*Primary Examiner* — Yonel Beaulieu
(74) *Attorney, Agent, or Firm* — Sughrue Mion, PLLC

(57) ABSTRACT

Flight equipment according to an embodiment of the present invention includes: an aerial vehicle having a body and at least one rotor held on the body; a plurality of supporters mounted to the aerial vehicle and supporting a protective member stretched therebetween so as to surround an outside of the body; a support information detection unit configured to detect support information indicating a support state of the protective member; and a mounting state determiner configured to determine whether the support state of the protective member is suitable or unsuitable, based on a value detected by the support information detection unit.

17 Claims, 9 Drawing Sheets

(51) Int. Cl.
    *G05D 1/00*         (2006.01)
    *B64C 39/02*       (2006.01)

(52) U.S. Cl.
    CPC ........ *G05D 1/0011* (2013.01); *B64C 2201/08* (2013.01); *B64C 2201/146* (2013.01); *B64D 2045/0085* (2013.01)

(58) Field of Classification Search
    CPC . B64C 2201/146; B64C 39/02; G05D 1/0011; G05D 1/00
    See application file for complete search history.

(56) References Cited

U.S. PATENT DOCUMENTS

| | | | |
|---|---|---|---|
| 2012/0234969 A1* | 9/2012 | Savoye | A63H 27/12 244/17.11 |
| 2014/0332620 A1 | 11/2014 | Earon | |
| 2016/0292846 A1* | 10/2016 | Sprock | G05B 19/00 |
| 2016/0292933 A1* | 10/2016 | Sprock | G06Q 50/08 |
| 2017/0029101 A1 | 2/2017 | Weissenberg | |
| 2017/0085840 A1 | 3/2017 | Mizushina et al. | |
| 2017/0322069 A1* | 11/2017 | Mastrianni | B64C 25/001 |
| 2018/0141641 A1* | 5/2018 | Griffin | B64C 3/00 |
| 2018/0232871 A1* | 8/2018 | Terry | G06V 20/17 |
| 2018/0319497 A1* | 11/2018 | Priest | B64C 39/024 |
| 2019/0066317 A1* | 2/2019 | Chang | G05D 1/0094 |
| 2019/0112072 A1* | 4/2019 | Abe | G01M 5/0041 |
| 2019/0120684 A1* | 4/2019 | Oren | G01M 1/125 |
| 2019/0127051 A1* | 5/2019 | Miyawaki | G01N 29/245 |
| 2019/0185161 A1* | 6/2019 | Eleryan | B64C 39/00 |
| 2019/0348862 A1* | 11/2019 | Obayashi | H02J 50/005 |
| 2019/0367166 A1 | 12/2019 | Yoshimura | |
| 2019/0382120 A1 | 12/2019 | Nakamura et al. | |
| 2021/0107646 A1* | 4/2021 | Sweeny | B64D 25/00 |
| 2021/0240205 A1* | 8/2021 | Kwak | G01C 5/06 |
| 2021/0287559 A1* | 9/2021 | Jeong | G05D 1/0044 |
| 2021/0331813 A1* | 10/2021 | Yi | G05D 1/0022 |
| 2021/0339845 A1* | 11/2021 | Milan | B64D 45/00 |
| 2021/0362875 A1* | 11/2021 | Yi | G05D 1/101 |
| 2021/0405655 A1* | 12/2021 | Yi | G05D 1/0011 |
| 2022/0100986 A1* | 3/2022 | Tanaka | G06N 20/00 |

FOREIGN PATENT DOCUMENTS

| | | |
|---|---|---|
| JP | 2014-169038 A | 9/2014 |
| JP | 2016-147565 A | 8/2016 |
| JP | 2017-056921 A | 3/2017 |
| JP | 6376672 A | 8/2018 |
| JP | 2018-199394 A | 12/2018 |
| WO | 2018020671 A1 | 2/2018 |
| WO | 2018/117199 A1 | 6/2018 |

OTHER PUBLICATIONS

International Search Report for PCT/JP2018/047365 dated Mar. 19, 2019 [PCT/ISA/210].
Notification of Reasons for Refusal issued in the JP Patent Application No. 2019-572242, dated Apr. 7, 2020.

* cited by examiner

FLIGHT EQUIPMENT, FLIGHT SYSTEM AND INFORMATION PROCESSING APPARATUS

CROSS REFERENCE TO RELATED APPLICATIONS

This application is a National Stage of International Application No. PCT/JP2018/047365 filed Dec. 21, 2018.

TECHNICAL FIELD

The present invention relates to flight equipment, a flight system and an information processing apparatus.

BACKGROUND ART

Aerial vehicles such as drones have been conventionally known which freely move in midair with the help of lift generated by rotation of rotors thereof. The rotors and other components of an aerial vehicle of this type can be damaged by contact that may be caused when the aerial vehicle collides with a tree or a building due to maneuvering by the user or influence of wind, or when the aerial vehicle makes an emergency landing on the ground. Since such damage to the rotors may hinder flight, a technique to mount a protective member (safety frame) to an aerial vehicle (drone) for preventing the rotors and other components from being damaged or distorted by an external impact has been proposed (see, for example, Patent Document 1).
Patent Document 1: Japanese Patent No. 6376672

SUMMARY OF INVENTION

Technical Problem

However, known techniques including the technique disclosed in Patent Document 1 assign importance to only the protection of the rotors and other components, and have room for improvement from the viewpoints of mountability of the protective member to an aerial vehicle and portability of flight equipment including the protective member.

Specifically, the protective member of Patent Document 1 is composed of a large number of plastic pipes and a plurality of joints. The plastic pipes are fitted into, and connected to, the joints, whereby the plastic pipes and the joints are assembled into a shape covering an aerial vehicle. The protective member of Patent Document 1 is assembled in a very complicated manner, and is designed without taking account of a possibility of detaching the protective member after use. If the protective member of Patent Document 1 was attached and detached before and after every use, it would be impossible to ensure the proper connection of the plastic pipes, and a part of the protective member may fall.

One or more embodiments of the present invention has been attained in view of the foregoing background, and is intend to achieve an object of providing flight equipment including an aerial vehicle and a protective member reliably mounted to the aerial vehicle, and providing a flight system and an information processing apparatus.

Solution to Problem

To achieve the above object, flight equipment according to an embodiment of the present invention includes: an aerial vehicle having a body and at least one rotor held on the body; a plurality of supporters mounted to the aerial vehicle and supporting a protective member stretched therebetween so as to surround an outside of the body; a support information detection unit configured to detect support information indicating a support state of the protective member; and a mounting state determiner configured to determine whether the support state of the protective member is suitable or unsuitable, based on the support information.

Advantageous Effects of Invention

One or more embodiments of the present invention provides flight equipment including an aerial vehicle and a protective member reliably mounted to the aerial vehicle, a flight system and an information processing apparatus.

DESCRIPTION OF EMBODIMENTS

Embodiments of the present invention will be described below with reference to the drawings. In the following description, unless otherwise noted, the plane on which a drone as an aerial vehicle lands is referred to as the "landing plane", and in particular, a direction in which the drone takes off as viewed from the landing plane is referred to as the "upward direction", while the direction opposite to the "upward direction" is referred to as the "downward direction". In addition, a distance from the landing plane in the upper direction is referred to as "height", and the "vertical direction" is defined to coincide with the upward/downward direction.

Figure 1:
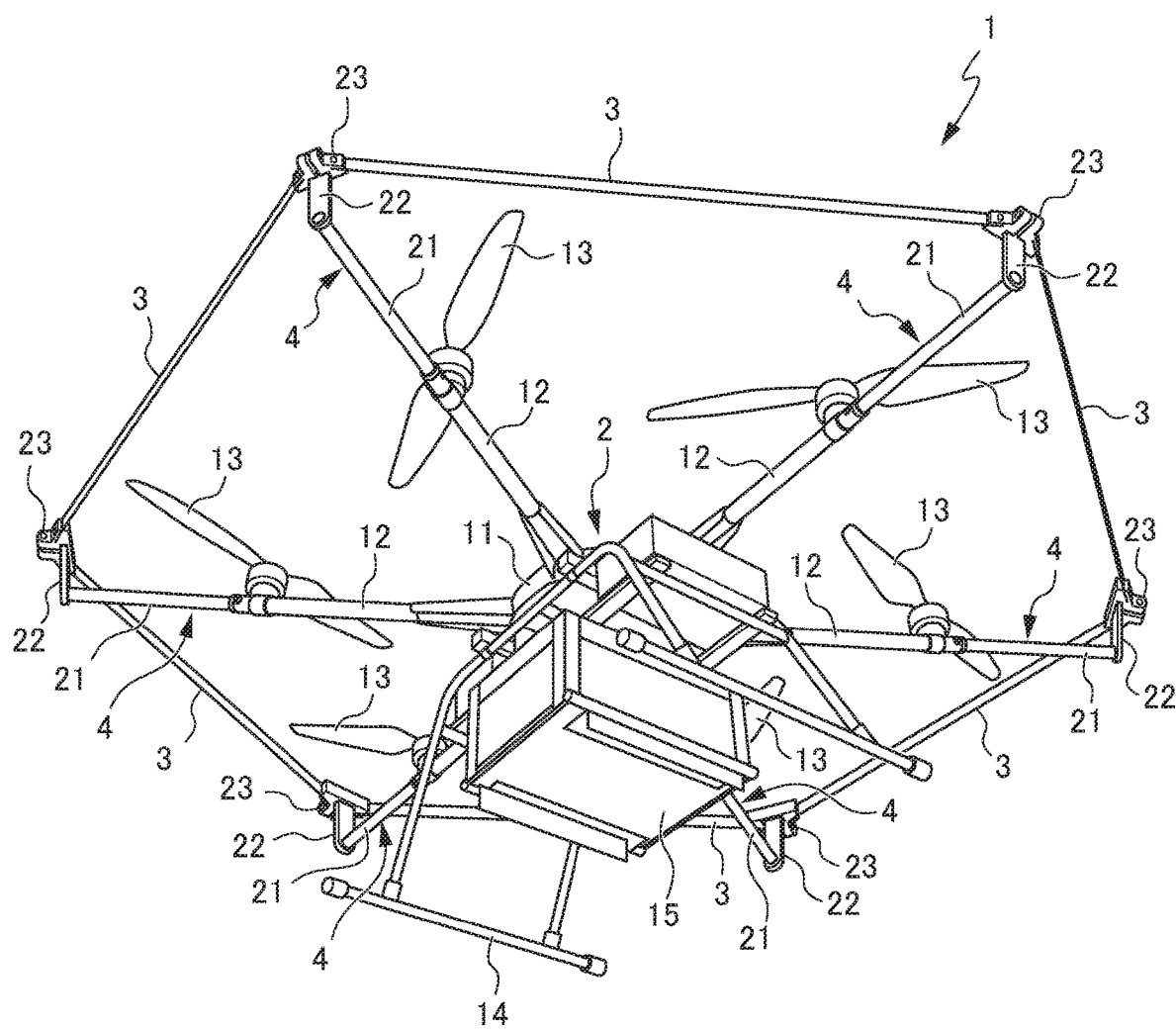
FIG. 1 is a perspective view showing an exemplary configuration of flight equipment according to an embodiment of the present invention.
Figure 2:
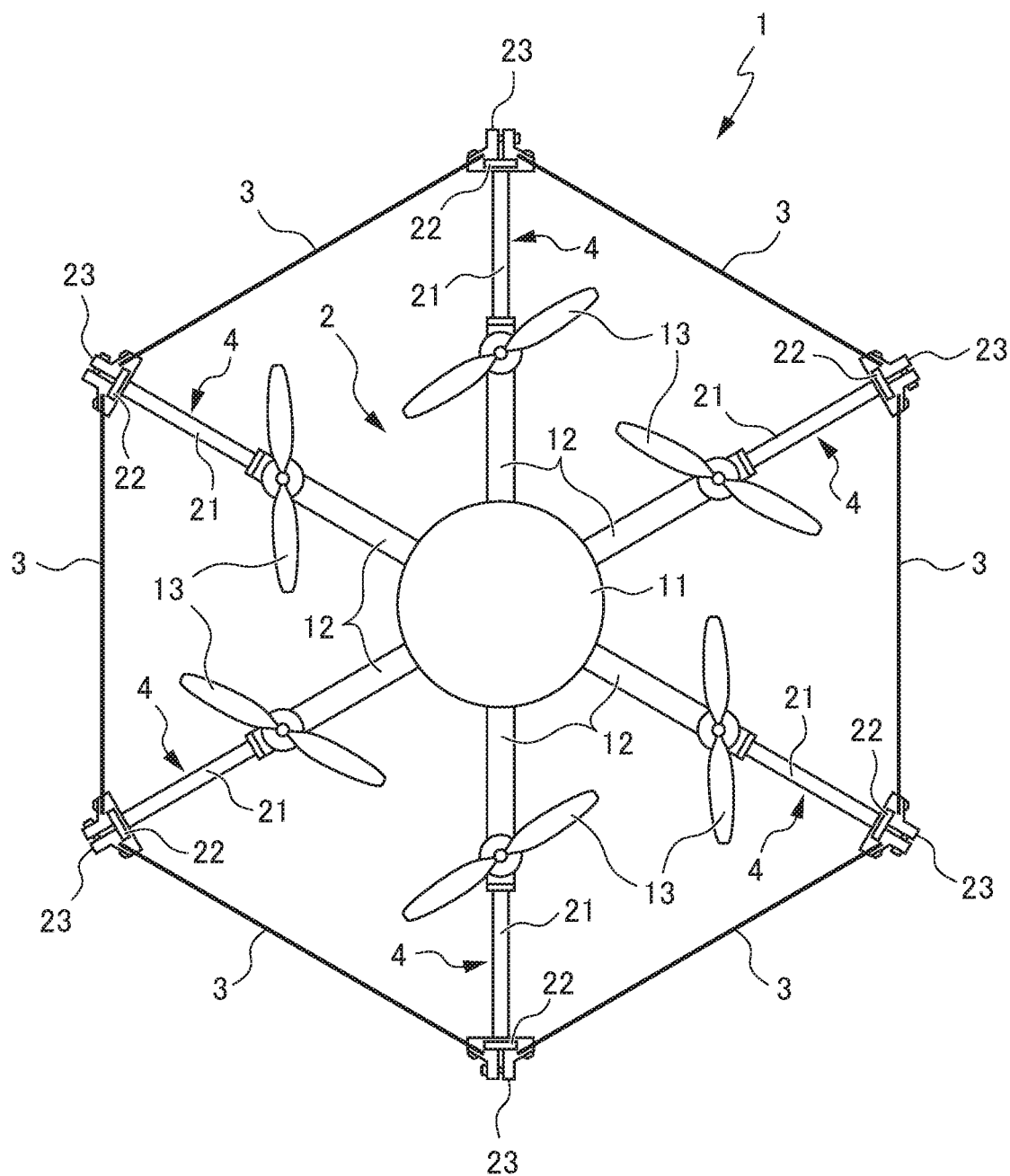
FIG. 2 is a schematic planar view showing the flight equipment of FIG. 1.

FIG. 1 is a perspective view showing an exemplary configuration of flight equipment 1 according to an embodiment of the present invention. FIG. 2 is a schematic planar view showing the flight equipment 1 of FIG. 1. Note that FIG. 2 shows the flight equipment 1 schematically as compared with FIG. 1, while omitting part of the configuration of the flight equipment 1.

First, the mechanical configuration of the flight equipment 1 will be described.

As shown in FIGS. 1 and 2, the flight equipment 1 includes: a drone (aerial vehicle) 2; protective members 3 stretched to surround an outside of the drone 2; and a plurality of supporters 4 mounted to the drone 2 and supporting the protective members 3.

The drone 2 can fly independently with the protective members 3 and the supporters 4 detached therefrom, and it is conceivable to sell the drone 2 alone.

The drone 2 includes: a body 11 housing an electronic device and the like that are necessary for processing for checking mounting suitability of the protective members 3 according to an embodiment of the present invention and for other control of the drone 2; a plurality of arms 12 that extend outward in a plane from the body 11; and a plurality of rotors 13 held by the body 11 via the arms 12. The drone 2 further includes, on the lower side of the body 11, legs 14 for contacting with the landing plane, a box 15 for accommodating a delivery target, and the like. Here, the term "outside" means a side away from the body 11 in planar view when the center of gravity or center of the body 11 of the drone 2 is defined as the base point. The "outside" can also be expressed as radially outside while the base point is set to be the center of a sphere.

The electronic device housed in the body 11 includes a computer device that performs processing according to an embodiment of the present invention to be described later, controls a motor for driving the rotors 13, transmits and receives signals to and from external devices such as a controller operated by an operator of the drone 2 (hereinafter the operator may be referred to also as the "user"), and performs processing based on information from various sensors such as a camera (not shown) provided on the body 11.

Each arm 12 is formed in a rod shape extending in a horizontal direction. One of the end portions of the arm 12 is connected to the body 11, and the other (hereinafter, referred to as the distal end portion) is provided with the rotor 13. In the present embodiment, the six arms 12 extend radially and symmetrically from the body 11 in planar view. The six arms 12 are equally spaced apart from each other in a circumferential direction.

The rotors 13 are held by the body 11 via the arms 12. Specifically, each rotor 13 is rotatably provided on an upper surface of the distal end portion of an associated one of the arms 12. The rotors 13 are mounted to the arms 12 such that their planes of revolution coincide with a horizontal plane. In the present embodiment, each of the six arms 12 is provided with the rotor 13. The six rotors 13 in total of the drone 2 rotate to generate lift for the flight equipment 1 including the supporters 4 to fly.

The protective members 3 are members that prevent the drone 2 from directly colliding with, for example, a building and a tree during flight of the flight equipment 1, and thereby protect the drone 2 from external impacts.

In the present embodiment, each of the plurality of protective members 3 is held between distal end portions of adjacent ones of the supporters 4. Consequently, the plurality of protective members 3 together form a loop shape surrounding the drone 2 in planer view.

Although it is suitable to stretch the protective members 3 so as to surround at least the body 11, stretching the protective members 3 to surround an outside of the rotors 13 as in the present embodiment makes it possible to prevent the rotors 13 from directly colliding with a building and the like during flight.

Each protective member 3 may be constituted by a flexible material that cannot maintain its shape by itself, such as a rope, a wire, etc. Alternatively, the protective member 3 may be constituted by a stiff material that is substantially undeformable, such as a rod member. However, the protective members 3 are preferably constituted by a material which has stiffness allowing the protective members 3 to be stretched between the supporters 4, and which has flexibility and elasticity allowing the protective members 3 to deform to a certain extent that facilitates attachment and detachment of the protective members 3. As such a material having stiffness, flexibility and elasticity, an elongated band-shaped member made of a composite material such as carbon fiber reinforced plastics (CFRP) can be sufficiently employed. In other words, it is desirable that the protective member 3 be produced by molding a material with a certain elastic modulus into a band shape having a small thickness, and thereby configured as a member that has a flexibility allowing bending deformation in the thickness direction while having a sufficient stiffness in the width direction. The term "band shape" as used herein means a shape having an average width that is five times or more as large as an average thickness. Note that the average width and the average thickness shall be calculated without taking account of a structure for causing the supporters to hold end portions and a structure which may be provided between the supporters for a different purpose (not included in the present embodiment).

The band-shaped protective member 3 is preferably supported such that the width direction thereof is substantially perpendicular to a rotation axis of the rotor 13. Thus, when the flight equipment 1 collides with another object (including a person, an animal, etc.) in the radial direction of the rotor 13, the protective member 3 can cushion the impact by contacting with the other object at a plane thereof, thereby making it possible to reduce damage to the other object.

Further, the protective member 3, which is arranged such that the thickness direction thereof is substantially perpendicular to the rotation axis of the rotor 13, resists flexure in a direction (vertical direction) parallel to the rotation axis of the rotor 13. That is, in the protective member 3, a flexural vibration (vertical shaking) in a direction parallel to the rotation axis of the rotor 13 is less likely to occur than a flexural vibration (horizontal shaking) in a direction (horizontal direction) perpendicular to the rotation axis of the rotor 13. As a result, even if a flexural vibration occurs in the protective member 3 that is held so as not to overlap with the rotor 13 as viewed in the radial direction, since a component in the direction of the rotation axis of the rotor 13 is small, the protective member 3 is less likely to contact with the rotor 13.

The supporters 4 are instruments for supporting the protective members 3 stretched around the drone 2. In the present embodiment, the supporters 4 are attached to the distal end portions of the six arms 12 on a one-to-one basis.

Each of the supporters 4 has; a fastenable part 21 that is mountable to the distal end portion of the arm 12 of the drone 2 and that extends substantially perpendicularly to the rotation axis of the rotor 13; an extension part 22 that is attached to a distal end portion of the fastenable part 21 and extends substantially parallel to the rotation axis of the rotor 13; and a holder part 23 that is attached to an upper end portion of the extension part 22 and holds end portions of the protective members 3. Note that "substantially perpendicular(ly)" as used herein means that a relative angle is 85° or larger and 95° or smaller. Further, "substantially parallel" means that a relative angle is 5° or smaller.

The fastenable parts 21 extend horizontally outwardly from the arms 12 such that the protective members 3 are supported outside the rotors 13 in planar view. The fastenable part 21 can be configured as a rod-shaped member, but is preferably configured as a cylindrical member that can house control-related components to be described later.

The extension parts 22 extend upward parallel to the rotation axes of the rotors 13, and accordingly, makes it possible to easily adjust a height of the holder parts 23, and thus, a height of the protective members 3 held by the holder parts 23. As a result, the protective members 3 can be supported at a height where the protective members 3 are prevented from contacting with the rotors 13.

The extension part 22 can be constituted by a material that is relatively lightweight and sufficiently stiff. Examples of such a material include resin, aluminum alloy, fiber reinforced plastics.

The extension part 22 is preferably formed into a band plate shape whose thickness direction is parallel to the direction in which the associated fastenable part 21 extends. In other words, it is preferable that the thickness direction of the extension part 22 be substantially perpendicular to the rotation axis of the rotor 13 and be toward the center of the body 11. Due to this configuration, a tension applied to the protective members 3 easily causes the extension parts 22 to elastically deform such that the distal end portions thereof move toward the body 11, thereby facilitating detection of the tension applied to the protective members 3.

Figure 3:
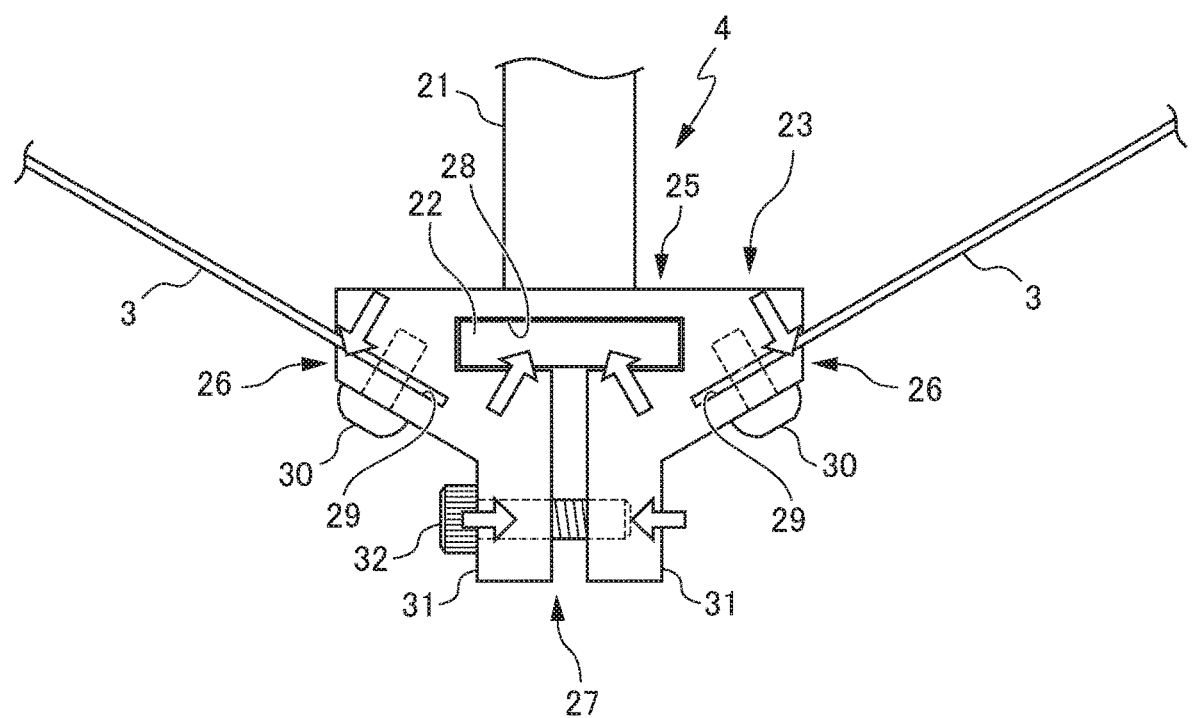
FIG. 3 is a planar view showing a supporter of the flight equipment of FIG. 1.

As shown in FIG. 3, each holder part 23 can be configured to have: a fastening structure 25 via which the holder part 23 is fastened to the extension part 22; a pair of holding structures 26 for holding end portions of the protective members 3; and a tension adjusting mechanism 27 that changes a tension applied to the protective members 3 by deforming the holder part 23 in planar view to change a distance between the pair of holding structures 26.

The fastening structure 25 can be configured to have a fitting hole 28 into which the extension part 22 is fitted. To prevent the extension part 22 from coming off, the fastening structure 25 may have a separately-provided fastening screw. However, in the present embodiment, the fastening structure 25 is configured such that when the tension adjusting mechanism 27 increases the tension applied to the protective members 3, the fitting hole 28 decreases in size to tighten the extension part 22.

Each holding structure 26 can be configured to have: a slit 29 into which the end portion of the protective member 3 is inserted; and a fastening screw 30 which is engageable with the protective member 3 inserted in the slit 29.

The tension adjusting mechanism 27 can be configured to have: a pair of levers 31 that extend adjacent to each other from the fastening structures 25 toward the outside as viewed from the body 11; and an adjusting screw 32 for fixing a clearance between distal end potions of the pair of levers 31. When the adjusting screw 32 is tightened to narrow the clearance between the distal end potions of the pair of levers 31, the tension adjusting mechanism 27 can deform the entire holder part 23 such that each fastening structure 25 is pivoted around the extension part 22 toward the outside as viewed from the body 11. As a result, the holding structures 26 are pulled toward the tension adjusting mechanism 27, thereby increasing the tension applied to the protective members 3.

Thanks to the configuration in which the supporters 4 support the protective members 3 so as to surround the body 11 and the rotors 13, the flight equipment 1 prevents the body 11 and the rotors 13 from directly colliding with buildings, trees, etc. when flying in the horizontal direction. The supporters 4 support the protective members 3 at the same height as the rotors 13 or at a position higher than the rotors 13. Thus, at the time of descending, the legs 14 arranged below the body 11 and the rotors 13 can prevent damage to the body 11 and the rotors 13. At the time of ascending, the protective members 3, which are positioned at the same height as the rotors 13 or at a position higher than the rotors 13, can effectively prevent damage to the body 11 and the rotors 13.

Next, a control configuration peculiar to the flight equipment 1 of the present embodiment will be described.

Figure 4:
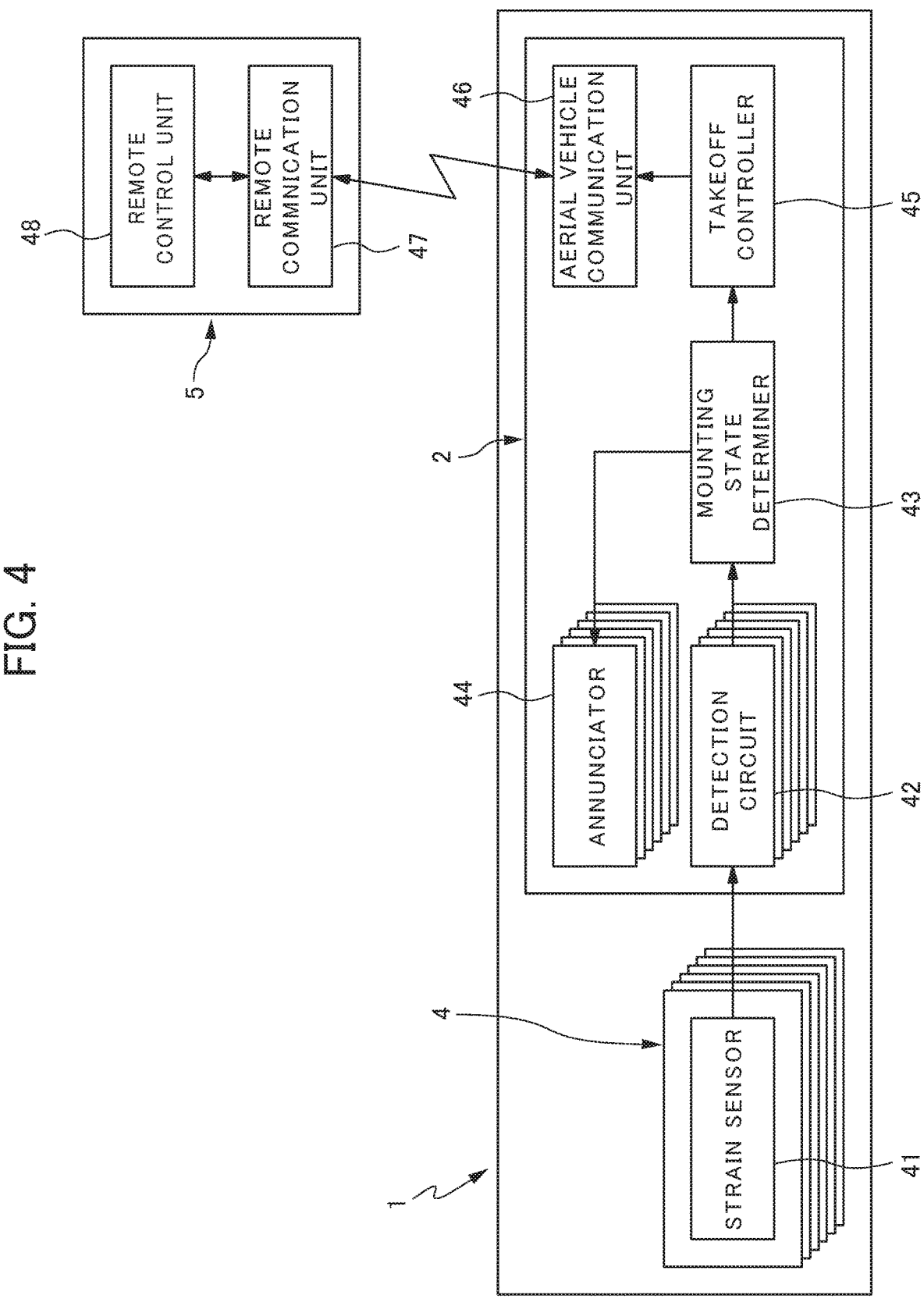
FIG. 4 is a block diagram showing an exemplary configuration of a flight system according to an embodiment of the present invention, the flight system including the flight equipment of FIG. 1.

FIG. 4 is a block diagram showing a configuration for performing characteristic control in a flight system including the flight equipment 1 of FIG. 1. Note that the entire flight system of FIG. 4 is per se a flight system according to an embodiment of the present invention.

The flight system includes: the flight equipment 1; and an information processing apparatus 5 for remotely controlling the flight equipment 1.

Each supporter 4 of the flight equipment 1 has a strain sensor 41 for detecting deformation of the extension part 22.

On the other hand, the drone 2 includes: a plurality of detection circuits 42 for converting values detected by the strain sensors 41 into electrical signals; a mounting state determiner 43 for determining whether the supporters 4 support the protective members 3 in a suitable or unsuitable support state, based on the outputs of the plurality of detection circuits 42 (the values detected by the strain sensors 41); annunciators 44 for displaying information corresponding to a determination result of the mounting state determiner 43; a takeoff controller 45 for determining whether to permit takeoff of the flight equipment 1, based on the determination result of the mounting state determiner 43; and an aerial vehicle communication unit 46 for wireless communication with the information processing apparatus 5.

The strain sensors 41 of the supporters 4 and the detection circuits 42 of the drone 2 together form a support information detection unit for detecting support information (in the present embodiment, deformation of the extension parts 22) indicating the support state of the protective members 3 supported by the supporters 4.

The information processing apparatus 5 includes: a remote communication unit 47 for wireless communication with the flight equipment 1; and a remote control unit 48 for performing processing necessary for remotely controlling the flight equipment 1.

Being affixed to the extension part 22, the strain sensor 41 can detect a degree of flexural deformation of the extension part 22 (a bend causing an upper end portion of the extension part 22 to move toward the body 11 side), which flexural deformation is caused by the tension applied to the protective members 3. In other words, the stronger the tension applied to the protective members 3 is, the greater the value detected by the strain sensor 41 is. Thus, the tension applied to the protective members 3 can be indirectly checked by way of the strain sensors 41.

Figure 5:
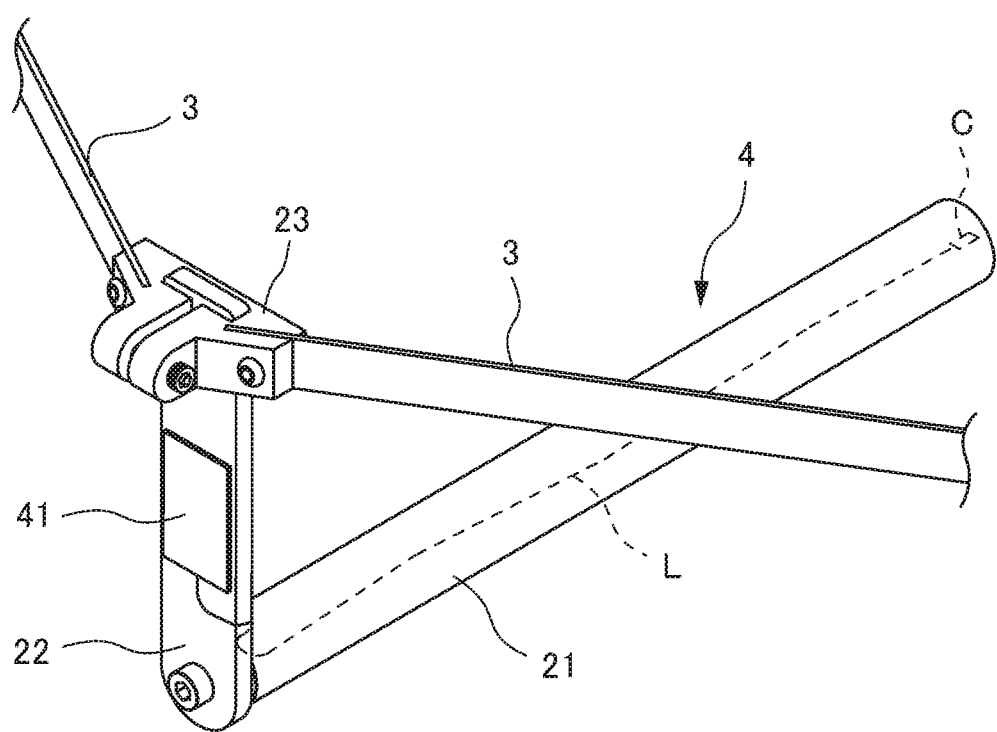
FIG. 5 is a perspective view of a supporter having a strain sensor of the flight system of FIG. 5 attached thereto.

It is preferable to affix the strain sensor 41 to the outer surface of the extension part 22 (the surface facing away from the body 11) as shown in FIG. 5, or to the inner surface of the extension part 22 (the surface facing the body 11). Alternatively, it is preferable to affix the strain sensors 41 to both surfaces of the extension part 22. Since the band plate-shaped extension part 22 elastically deforms to a relatively large extent in accordance with the tension applied to the protective members 3, the tension applied to the protective members 3 can be relatively accurately determined by the strain sensor 41.

Any sensor detecting a strain caused by flexure of the extension part 22 can be used as the strain sensor 41. Examples of such a sensor for detecting a strain include a strain gauge whose electrical resistance is changed by a strain (by deformation of itself), a capacitance sensor whose capacitance is changed by a strain, etc.

The detection circuit 42 is a circuit for outputting an electrical signal that varies in response to a change in electrical characteristics of the strain sensor 41. The detection circuit 42 may be constituted, for example, by a known Wheatstone bridge circuit. Specifically, in the case where the strain sensors 41 are affixed on both surfaces of the extension part 22, a Wheatstone bridge circuit according to the two gauge method is suitably used.

The detection circuits 42 may be arranged in the arms 12 on a one-to-one basis, or may be arranged in the body 11. In the case of being arranged in the body 11, the plurality of detection circuits 42 may be formed on a single circuit board.

As shown in FIG. 5, at least a portion of a line L between the strain sensor 41 and the detection circuit 42 is preferably positioned inside the fastenable part 21. Further, a connector C may be provided between the strain sensor 41 and the detection circuit 42, the connector C enabling electrical connection between the strain sensor 41 and the detection circuit 42, while allowing the fastenable part 21 to be attached to and detached from the arm 12. In this case, in order to facilitate the coupling and decoupling of the connector C, the connector C may be configured to be pulled out from the arm 12 or the fastenable part 21 by way of a sufficiently long lead wire employed as the line L between the connector C and the strain sensor 41 or the detection circuit 42. Alternatively, the arm 12 and the fastenable part 21 may each have a connector C mechanically incorporated therein such that mechanical connection between the arm 12 and the fastenable part 21 results in electrical connection between the strain sensor 41 and the detection circuit 42.

The mounting state determiner 43 determines whether the support state of the protective members 3 supported by the supporters 4 is suitable or unsuitable, based on the values detected by the strain sensors 41 (the outputs of the detection circuits 42) that constitute the support information. Specifically, the mounting state determiner 43 may be configured to determine that the supporters 4 unsuitably stretch the protective members 3 when the values (degrees of strain) detected by the strain sensors 41 corresponding to the tension applied to the protective members 3 are less than a preset lower limit value. Alternatively, the mounting state determiner 43 may be configured to determine that the support state of the protective members 3 is unsuitable when the values detected by the strain sensors 41 exceed a preset upper limit value. Furthermore, the mounting state determiner 43 may determine whether the support state of the protective members 3 is suitable or unsuitable while taking account of a relationship between the values detected by the plurality of strain sensors 41.

The mounting state determiner 43 may be configured as an analog circuit including a comparator and the like, or may be configured to digitally convert the outputs of the detection circuits 42 and arithmetically process the outputs by a microprocessor. The mounting state determiner 43 may be formed on the same circuit board where part or all of the detection circuits 42 and the takeoff controller 45 are provided. The mounting state determiner 43 is preferably housed in the body 11. Further, the mounting state determiner 43 may be implemented as one function of a control device that also performs other control of the drone 2. In other words, the mounting state determiner 43 can be implemented by addition of a subroutine, a subprogram, or the like to the programs of the computer constituting the control device for the drone 2. Thus, the mounting state determiner 43 is to be functionally distinguishable, and does not need to be a physically independent component.

Figure 6:
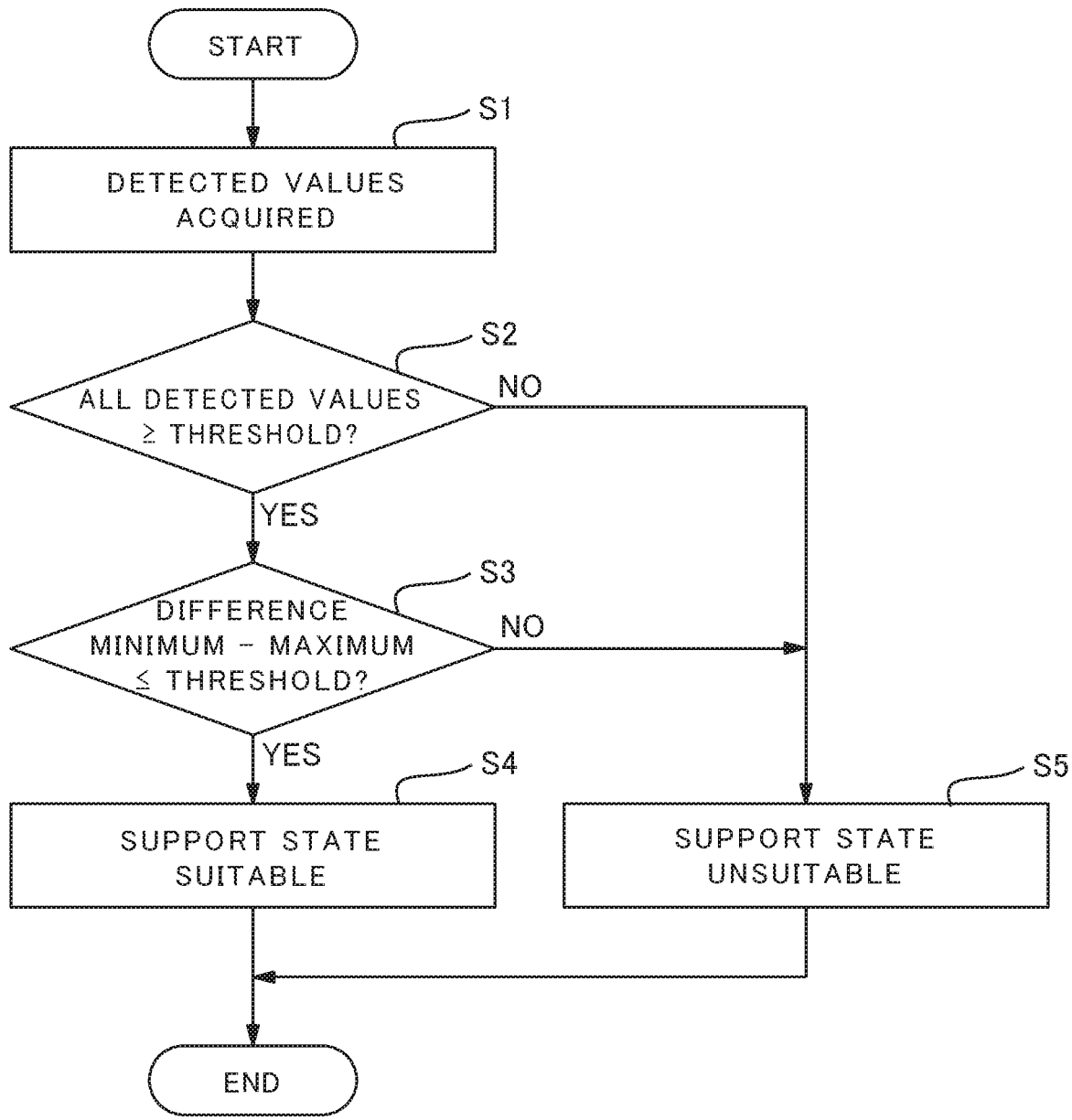
FIG. 6 is a flowchart showing a control procedure performed by a takeoff controller of the flight system of FIG. 4.

FIG. 6 is a flowchart showing a control procedure performed by the takeoff controller 45 according to the present embodiment.

In Step S1, the takeoff controller 45 first acquires the outputs of the detection circuits 42 (the values detected by the strain sensors 41) as the support information. Next, in Step S2, the takeoff controller 45 checks whether all the detected values are equal to or greater than a preset first threshold. When it is confirmed that the values detected by the strain sensors 41 are all equal to or greater than the first threshold in Step S2, the procedure proceeds to Step S3, where it is checked whether a difference between a maximum and a minimum of the values detected by the strain sensors 41 is equal to or less than a preset second threshold. When the difference between the maximum and the minimum of the values detected by the strain sensors 41 is determined to be equal to or less than the second threshold in Step S3, the procedure proceeds to Step S4, where a determination is made that all the supporters 4 support the protective members 3 in the suitable support state. When the value detected by any of the strain sensors 41 is determined to be less than the first threshold in Step S2, and when the difference between the maximum and the minimum of the values detected by the strain sensors 41 is determined to exceed the threshold in step S3, the procedure proceeds to Step S5, where a determination is made that the support state of the protective members 3 supported by the supporters 4 is unsuitable.

When the difference between the maximum and the minimum of the values detected by the strain sensors 41 is large, there is a possibility that abnormal vibration occurs in the protective members 3 or a load is concentrated to a particular one of the supporters 4. Thus, such a large difference can be considered to indicate the unsuitable support state which may impair the function of the protective members 3 during flight.

The annunciators 44 can have any configuration capable of conveying information to the user, such as an indicator lamp, a display panel, and a speaker. For example, each annunciator 44 can be configured to have an LED that changes in lighting state in accordance with a determination result of the mounting state determiner 43. The LED of the annunciator 44 may be turned on only before takeoff, or before and after the takeoff. Further, the change in the lighting state of the LED is not particularly limited as long as the change is recognizable for the user. Example of the change in the lighting state include a transition between the on and off states of the light, a change in an on period and an off period in blinking, a change in color of a LED of three-color emission type. The LEDs of the annunciators 44 may be used as indicator lamps for indicating the position and orientation of the drone 2 during flight.

The annunciators 44 preferably announce the presence of the unsuitable support state such that it can be identified which of the supporters 4 supports the protective members 3 is in the unsuitable support state. Specifically, the annunciators 44 may include a plurality of LEDs disposed at positions corresponding to the supporters (e.g., on the arms 12 or at positions on the body 11 adjacent to the arms 12), and may be configured to change the lighting state of the LED corresponding to the supporter 4 in the unsuitable support state. Alternatively, the annunciators 44 may include a display panel for displaying a letter or an image to allow identification of the supporter 4 in the unsuitable support state. Alternatively, the annunciators 44 may include a speaker, and may be configured to announce the supporter 4 in the unsuitable support state by a voice message or the like.

The annunciators 44 may be configured to provide display corresponding to a determination result of the takeoff controller 45 to be described later: that is, the annunciators 44 may display whether takeoff is permitted.

The takeoff controller 45 can be configured to permit takeoff of the flight equipment 1 only when all the mounting state determiners 43 determine that the support state of the protective members 3 supported by the respective supporters 4 is suitable. In other words, the takeoff controller 45 determines to permit the takeoff on the condition that all the supporters 4 support the protective members 3 in the suitable support state. In addition to this, a remaining battery level and a GPS signal reception status are also set as the condition for permitting takeoff.

The takeoff controller 45 can be provided in the body 11. The takeoff controller 45 may be implemented as one function of the control device that also performs other control of the drone 2. In other words, the takeoff controller 45 can be implemented by addition of a subroutine, a subprogram, or the like to the programs of the computer constituting control device of the drone 2. Therefore, the takeoff controller 45 is to be functionally distinguishable, and does not need to be a physically independent component.

The aerial vehicle communication unit 46 and the remote communication unit 47 are each a transmitting-receiving device intended for wireless communication. A frequency and an output of a radio wave (including light) transmitted and received by the aerial vehicle communication unit 46 and the remote communication unit 47, and a communication method of the aerial vehicle communication unit 46 and the remote communication unit 47 can be appropriately selected in accordance with the purpose of use of the flight equipment 1, for example.

The remote control unit 48 is a device for providing the flight equipment 1 with instructions on a flight path, a flight speed, and operations such as shooting by a camera. The remote control unit may be constituted by a programmable computer.

The remote control unit 48 may be configured to cause the flight equipment 1 to make emergency landing upon receiving a determination result of the mounting state determiner 43 that the support state of the protective members 3 supported by the supporters 4 is unsuitable, during flight of the flight equipment 1.

The information processing apparatus 5 including the remote communication unit 47 and the remote control unit 48 may be constituted by a commercially available computer device (e.g., a smartphone, a tablet, a personal computer, etc.) having communication facility and including a dedicated program loaded therein.

The information processing apparatus 5 may be configured to display a determination result of the mounting state determiner 43 and a determination result of the takeoff controller 45. The determination result of the mounting state determiner 43 is preferably displayed to allow identification of a supporter 4 that has been determined to support the protective members 3 in the unsuitable support state. Therefore, it is preferable that the drone 2 transmit at least one of the determination result of the mounting state determiner 43 or the determination result of the takeoff controller 45 to the information processing apparatus 5, using the aerial vehicle communication unit 46 and the remote communication unit 47. Thus, even at a location away from the flight equipment 1, the information processing apparatus 5 allows the user to check whether the support state of the protective members 3 is suitable or unsuitable.

The mounting state determiner 43 is capable of checking whether the protective members 3 are suitably supported by the supporters 4 by way of the values detected by the strain sensors 41 (support information). Consequently, in the flight equipment 1, the protective members 3 can be reliably mounted to the drone 2 when the flight equipment 1 is used. In particular, the configuration in which the strain sensors 41 detect the strain caused by the tension applied to the protective members 3 ensures that the protective members 3 are under a suitable tension, whereby the protective members 3 can sufficiently exhibit impact absorbing performance. Further, in the flight equipment 1, since each supporter 4 has the strain sensor 41, it can be ensured that all of the plurality of protective members 3 suitably support the protective members 3.

The flight equipment 1, which includes the annunciators 44, allows the user to easily check whether the support state of the protective members 3 is suitable or unsuitable. Further, even when the user neglects to check the suitability of the support state of the protective members 3, the takeoff controller 45 included in the flight equipment 1 can prevent flight of the flight equipment 1 when the protective members 3 are in the unsuitable support state.

Next, a flight system according to an embodiment different from that shown in FIG. 4 will be described. The flight system of the present embodiment includes: flight equipment 1a; and an information processing apparatus 5a. The mechanical configuration of the flight equipment 1a of the present embodiment is the same or similar to that of the flight equipment 1 shown in FIG. 1, whereas a control-related configuration of the flight equipment 1a solely constitutes a difference from the flight equipment 1. Therefore, in the following description, components that are the same as those described earlier are denoted by the same reference characters, and detailed description thereof will be omitted.

Figure 7:
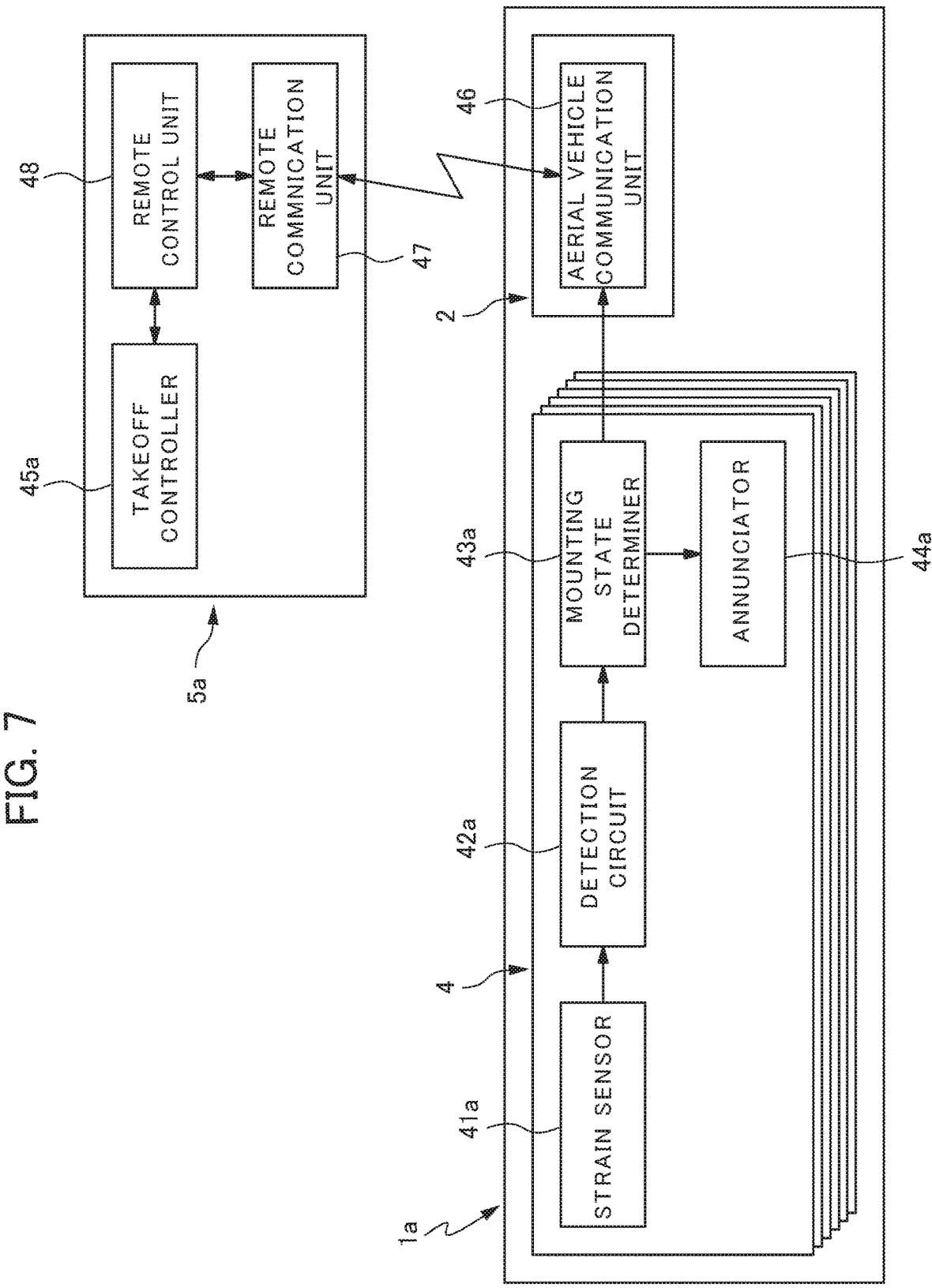
FIG. 7 is a block diagram showing a flight system according to an embodiment different from that shown in FIG. 4.

FIG. 7 is a block diagram showing a configuration for performing characteristic control in the flight system of the present embodiment.

The flight equipment 1a includes supporters 4 each of which has: a strain sensor 41a for detecting deformation of a holder part 23 as support information; a detection circuit 42a for converting a value detected by the strain sensor 41a into an electrical signal; a mounting state determiner 43a for determining whether a support state of protective members 3 supported by the supporters 4 is suitable or unsuitable, based on an output of the detection circuit 42a (the value detected by the strain sensor 41a); and an annunciator 44a for displaying information corresponding to a determination result of the mounting state determiner 43a. For the purpose of protection, the detection circuit 42a and the mounting state determiner 43a are preferably arranged inside a fastenable part 21 of the supporter 4.

A drone 2 has an aerial vehicle communication unit 46 configured to transmit determination results of the mounting state determiners 43a of the supporters 4 via wireless communication with the information processing apparatus 5a.

The information processing apparatus 5a includes: a remote communication unit 47 for wireless communication with the flight equipment 1a; a takeoff controller 45a for determining whether to permit takeoff of the flight equipment 1a, based on determination results of the mounting state determiners 43a; and a remote control unit 48 for performing other processing necessary for remotely controlling the flight equipment 1a.

Figure 8:
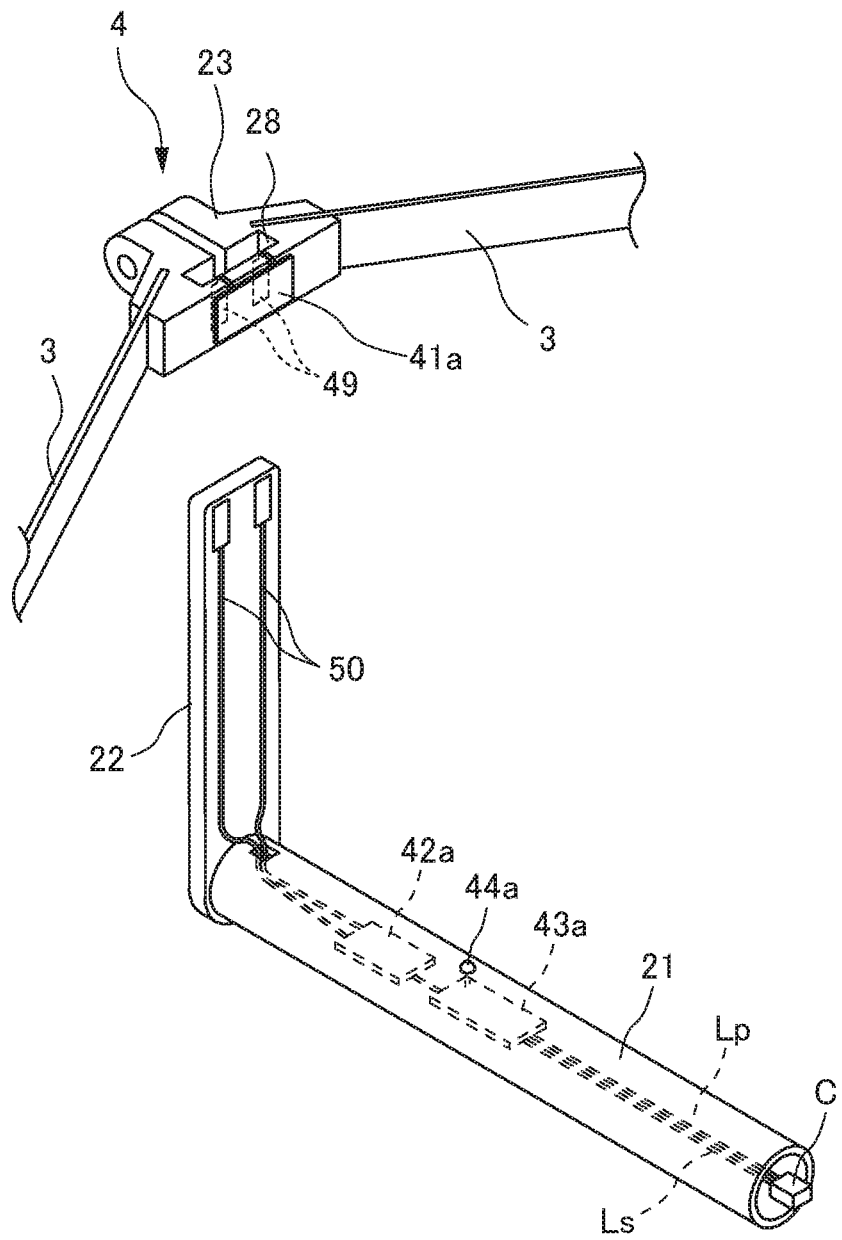
FIG. 8 is a partially exploded perspective view of a supporter, and shows a structure for attaching a strain sensor of the flight system of FIG. 7.

As shown in FIG. 8, the strain sensor 41a is affixed to a surface of a holder part 23, the surface facing a body 11. The strain sensor 41a has a pair of terminals 49 arranged on an inner surface of a fitting hole 28. On an extension part 22, two wires 50 are arranged so as to be in electric contact with the terminals 49 in a state where the holder part 23 have been attached to the extension part 22. To ensure the electric contact, it is preferable that planar conductors be exposed in a contact portion between the terminals 49 and the wires 50.

When a tension adjusting mechanism 27 applies (increases) a tension to the protective members 3, the surface of the holder part 23 to which the strain sensor 41a is affixed deforms to become convex toward the body 11. The strain sensor 41a detects this deformation of the holder part 23. Thus, the values detected by the strain sensors 41a of the present embodiment allow a determination on whether the supporters 4 suitably support the protective members 3 in a state where a suitable tension is applied to the protective members 3.

The detection circuit 42a is designed to be arrangeable in the supporter 4, but in electrical terms, can have the same circuit configuration as of the detection circuit 42 shown in FIG. 4.

The mounting state determiner 43a determines that the associated supporter 4 supports the protective members 3 in the unsuitable support state when a value detected by the associated strain sensor 41a is less than a preset lower limit value or greater than a preset upper limit value. The mounting state determiner 43a can be constituted by an analogue circuit or a circuit having a microprocessor, and may be formed on the same circuit board where the detection circuit 42a is formed.

Although being arranged on the supporter 4, the annunciator 44a has the same function as of the annunciator 44 shown in FIG. 4. This configuration simplifies the wiring from the mounting state determiner 43a arranged in the supporter 4. The annunciators 44a arranged on the supporters 4 allow the user to further easily identify which of the supporters 4 supports the protective members 3 in an unsuitable state.

A takeoff controller 45a is implemented by a program of a computer device constituting the information processing apparatus, and is integral with the remote control unit 48.

As shown in FIG. 8, the wiring between the mounting state determiner 43 and the aerial vehicle communication unit 46 preferably includes, in addition to a signal line Ls through which a signal is transmitted and received between the aerial vehicle communication unit 46 and the mounting state determiner 43, a power line Lp through which power is supplied from the aerial vehicle communication unit 46 to the mounting state determiner 43.

In the present embodiment, the information processing apparatus 5a has the takeoff controller 45a. Therefore, the drone 2 wirelessly transmits determination results of the mounting state determiners 43a to the information processing apparatus 5a. This configuration allows the information processing apparatus 5a to prohibit flight of the flight equipment 1a when the support state of the protective members 3 is unsuitable.

Next, a flight system according to an embodiment different from those shown in FIGS. 4 and 7 will be described. The flight system shown in FIG. 9 includes: flight equipment 1b; and an information processing apparatus 5b according to an embodiment of the present invention. The mechanical configuration of the flight equipment 1b of the present embodiment is the same or similar to the mechanical configuration of the flight equipment 1 shown in FIG. 1, whereas a control-related configuration of the flight equipment 1b solely constitutes a difference from the flight equipment 1.

Figure 9:
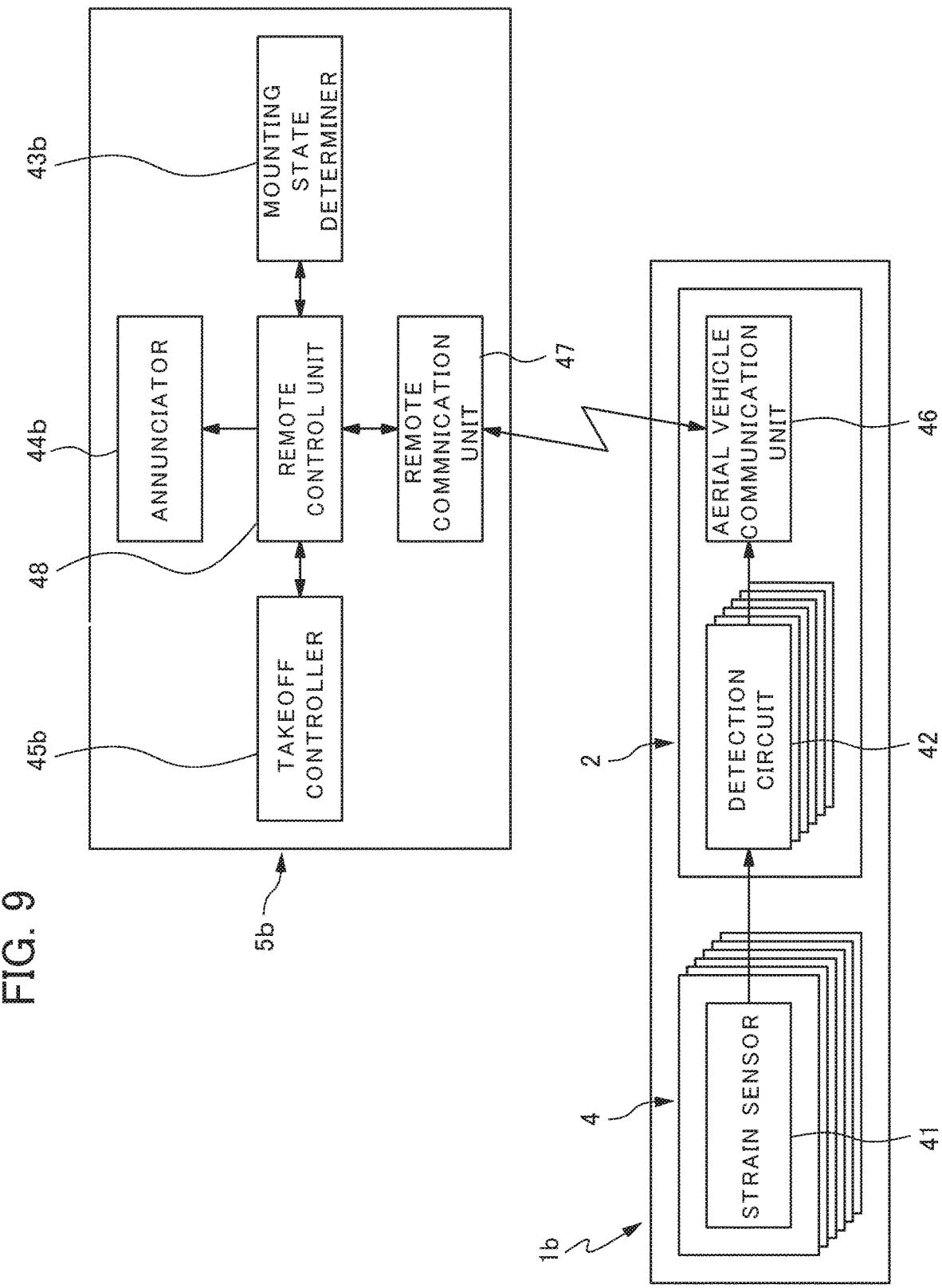
FIG. 9 is a block diagram of a flight system according to an embodiment different from those shown in FIGS. 4 and 7.

FIG. 9 is a block diagram showing a configuration for performing characteristic control in the flight system of the present embodiment.

The flight equipment 1b includes supporters 4, each of which has a strain sensor 41 for detecting deformation of a holder part 23 as support information.

A drone 2 has: a plurality of detection circuits 42a for converting values detected by the strain sensors 41 (the support information) into respective electrical signals; and an aerial vehicle communication unit 46 for wireless communication with the information processing apparatus 5b.

The information processing apparatus 5b includes: a remote communication unit 47 for wireless communication with the flight equipment 1b; a mounting state determiner 43b for comprehensively determining whether a support state of protective members 3 supported by the supporters 4 is suitable or unsuitable, based on outputs of the plurality of detection circuits 42 (the values detected by the strain sensors 41); an annunciator 44b for displaying information corresponding to a determination result of the mounting state determiner 43b; a takeoff controller 45b for determining whether to permit takeoff of the flight equipment 1b, based on the determination result of the mounting state determiner 43b; and a remote control unit 48 for performing other processing necessary for remotely controlling the flight equipment 1b.

Like the strain sensor 41 shown in FIG. 5, each strain sensor 41 of the present embodiment detects flexural deformation of an extension part 22 of the associated supporter 4, which flexural deformation is caused by a tension applied to the protective members 3.

Each detection circuit 42 of the present embodiment can have the same or similar configuration to that of the detection circuit 42 shown in FIG. 4.

The information processing apparatus 5b of the flight system shown in FIG. 9 is per se an information processing apparatus according to an embodiment of the present invention. In the information processing apparatus 5b, the remote communication unit 47 functions as a support information acquisition unit for acquiring support information (the values detected by the strain sensors 41) indicating a support state of the protective members 3 supported by the supporters 4.

In the present embodiment, the mounting state determiner 43b and the takeoff controller 45b are provided in the information processing apparatus 5b. Each of the mounting state determiner 43b and the takeoff controller 45b can be implemented as part of a program of a computer device constituting the information processing apparatus 5b. Thus, the mounting state determiner 43b determines whether the support state of the protective members 3 supported by the supporters 4 is suitable or unsuitable, based on outputs of the detection circuits 42 (values detected by the strain sensors 41) that are input to the mounting state determiner 43b via the aerial vehicle communication unit 46 and the remote communication unit 47. The processing carried out by the mounting state determiner 43b and the takeoff controller 45b of the information processing apparatus 5b shown in FIG. 9 may be the same or similar to the processing carried out by the mounting state determiner 43 and the takeoff controller 45 of the flight equipment 1 shown in FIG. 4.

The annunciator 44*b* can be constituted by a display panel, a speaker, etc. of the computer device constituting the information processing apparatus 5*b*, for example. The annunciator 44*b* preferably displays the presence of the unsuitable support state such that it can be identified which of the supporters 4 supports the protective members in the unsuitable support state, and displays a determination result of the takeoff controller 45*b*.

When the protective members 3 are in the unsuitable support state, the information processing apparatus 5*b* of the present embodiment can prohibit flight of the flight equipment 1*b*, and can ensure that the protective members 3 are reliably mounted to the flight equipment 1*b* via the supporters 4.

Three embodiments of the present invention have been described in the foregoing. However, the present invention is not limited to the embodiments described above, but encompasses variations, modifications, etc. within the scope in which the object of the present invention can be achieved.

The flight equipment according to each embodiment of the present invention does not have to include the dedicated protective member, and a protective member provided separately by the user may be used in the flight equipment. Examples of general-purpose articles usable as the protective member include various ropes and wires, resin bands and metal bands for packaging or binding, etc.

In the flight equipment according to each embodiment of the present invention, the strain sensor may be arranged to detect deformation of a different portion of the supporter. The strain sensor does not need to be provided to every supporter. Specifically, arranging at least one strain sensor so as to detect deformation of any one of the supporters makes it possible to presume support states of all the protective members that are connected to one another in a loop shape. As a specific example, the strain sensor shown in FIG. 8 may be employed as the strain sensor of the embodiments shown in FIGS. 4 and 9. The strain sensor shown in FIG. 5 may be employed as the strain sensor of the embodiment shown in FIG. 7.

In the flight equipment according to each embodiment of the present invention, a support information detection unit may be configured to acquire the support information by way of a sensor other than the strain sensor, such as a distance sensor for measuring, for example, a distance between the body and a distal end portion of the supporter. In the flight equipment according to each embodiment of the present invention, the support information detection unit may detect, as the support information, a change in a state of a sensor provided to the protective member. In the flight equipment according to each embodiment of the present invention, the support information detection unit may detect the support information in binary.

The flight equipment according to each embodiment of the present invention may be configured to wirelessly transmit a signal between the aerial vehicle and the supporters. Specifically, the flight equipment of one or more embodiments of the present invention may include a battery in the supporter, and a wireless transmitter in place of the connector of the embodiment described above. The flight equipment of one or more embodiments of the present invention may be configured to supply power from the aerial vehicle to the supporters wirelessly.

In the flight equipment according to each embodiment of the present invention, the supporter may be configured to apply a tension to the protective members by changing a distance from the body to the distal end portion of the supporter.

In the flight equipment according to each embodiment of the present invention, the number of the supporters is not limited to six, but can be any number equal to or greater than three.

In the flight equipment according to each embodiment of the present invention, the protective member may be embodied as a single loop-shaped member supported by the plurality of supporters. In this case, the plurality of supporters can support the protective member such that the protective member is movable in the length direction thereof, and at least one of the supporters can have a mechanism for applying a tension to the protective member. In this case, the holder part to which the protective member is not fastened may have a ring, a guide groove, a pulley, etc., for guiding the protective member.

The flight equipment according to each embodiment of the present invention may further include a mechanism that adjusts a tension applied to the protective member without moving the distal end portion of the supporter, such as a mechanism that applies the tension by moving an end of the protective member in a stretching direction.

The flight equipment according to each embodiment of the present invention may be configured such that a plurality of supporters three-dimensionally hold the protective members. For example, in addition to supporters extending outward from the aerial vehicle, vertically-extending supporters can be provided. These supports can have the protective members stretched between distal end portions thereof so as to surround at least the body of the aerial vehicle also in side view.

For example, in each embodiment described above, the drone is exemplified as the aerial vehicle. However, the aerial vehicle is not particularly limited to the drone, and any aerial vehicle including a manned aerial vehicle may be employed suitably.

As described above, the embodiments of the present invention achieve advantageous effects due to the following configurations.

Flight equipment (e.g., flight equipment 1, 1*a*) according to an embodiment of the present invention includes: an aerial vehicle (e.g., a drone 2) having a body (e.g., a body 11) and at least one rotor (e.g., a rotor 13) held on the body; a plurality of supporters (e.g., supporters 4) mounted to the aerial vehicle and supporting a protective member (e.g., a protective member 3) stretched therebetween so as to surround an outside of the body; a support information detection unit (e.g., strain sensors 41, 41*a* and a detection circuits 42, 42*a*) configured to detect support information indicating a support state of the protective member; and a mounting state determiner (e.g., a mounting state determiner 43, 43*a*) configured to determine whether the support state of the protective member is suitable or unsuitable, based on a value detected by the support information detection unit. In the flight equipment having this feature, the support information detection unit allows checking the support state of the supporters. Thus, the mounting state determiner can determine whether the supporters suitably support the protective member. Thus, when used, the flight equipment can have the protective member reliably mounted to the aerial vehicle.

In flight equipment according to an embodiment of the present invention, the support information detection unit may have a strain sensor (e.g., a strain sensor 41, 41*a*) configured to detect deformation of the supporter, the deformation being caused by a tension applied to the protective member. This feature in which the strain sensor detects a strain caused by a tension applied to the protective member ensures that the protective member is under a suitable tension, thereby enabling the protective member to sufficiently exhibit impact absorbing performance.

In flight equipment according to an embodiment of the present invention, the supporter may have: a fastenable part (e.g., a fastenable part 21) mounted to the aerial vehicle and extending substantially perpendicularly to a rotation axis of the rotor; and an extension part (e.g., an extension part 22) attached to a distal end portion of the fastenable part and extending substantially parallel to the rotation axis of the rotor, and the strain sensor may be arranged on the extension part. This feature enables the strain sensor to measure an amount of flexural deformation of the extension part, the amount depending on a tension applied to the protective member. Thus, a suitable support state of the protective member can be determined further accurately.

In flight equipment according to an embodiment of the present invention, the strain sensor may include a plurality of strain sensors that are arranged on the plurality of supporters on a one-to-one basis. This feature can ensure that all the supporters support the protective members while applying a suitable tension to the protective members.

In flight equipment according to an embodiment of the present invention, the mounting state determiner may determine that the support state of the protective member is unsuitable when a difference between a maximum and a minimum of values detected by the support information detection unit exceeds a preset threshold. This feature can prevent stress concentration and abnormal vibration which can be caused by a situation where the plurality of supporters ununiformly support the protective member, whereby the protective member can be prevented from providing insufficient protection.

In flight equipment according to an embodiment of the present invention, the mounting state determiner may be arranged on the supporter. This feature ensures that the plurality of protective members are all suitably mounted.

In flight equipment according to an embodiment of the present invention, the aerial vehicle or the supporters may further include an annunciator (e.g., annunciator 44, 44a) configured to announce information corresponding to a determination result of the mounting state determiner. This feature allows the user to easily appreciate the support state of the protective member.

In flight equipment according to an embodiment of the present invention, the annunciator may be configured to announce the information such that it can be identified which of the plurality of supporters supports the protective member in the unsuitable support state. This feature allows the user to easily identify the supporter supporting the protective members in the unsuitable support state and to adjust and bring the identified supporter into a suitable support state.

Flight equipment according to an embodiment of the present invention may further include a takeoff controller (e.g., a takeoff controller 45, 45a) configured to determine whether to permit takeoff of the flight equipment, based on a determination result of the mounting state determiner. Even when the user neglects to check the suitability of the support state of the protective members, this feature can prevent flight of the flight equipment having the protective members being in the unsuitable support state.

A flight system according to an embodiment of the present invention includes: the above-described flight equipment (e.g., the flight equipment 1); and an information processing apparatus (e.g., an information processing apparatus 5) configured to wirelessly communicate with the flight equipment and to control flight of the flight equipment, wherein the aerial vehicle transmits a determination result of the takeoff controller (e.g., a takeoff controller 45) to the information processing apparatus. When the takeoff controller prohibits flight of the flight equipment, this feature makes it possible for the information processing apparatus to confirm the prohibition.

A flight system according to an embodiment of the present invention includes: the above-described flight equipment (e.g., the flight equipment 1); and an information processing apparatus (e.g., an information processing apparatus 5) configured to wirelessly communicate with the flight equipment and to control flight of the flight equipment, wherein the aerial vehicle transmits a determination result of the mounting state determiner to the information processing apparatus. With this feature, the information processing apparatus can prohibit flight of the flight equipment when the protective member of the flight equipment is in the unsuitable support state. Thus, protection of the aerial vehicle can be ensured.

A flight system according to an embodiment of the present invention includes: the above-described flight equipment (e.g., the flight equipment 1a); and an information processing apparatus (e.g., an information processing apparatus 5a) configured to wirelessly communicate with the flight equipment and to control flight of the flight equipment, wherein the aerial vehicle transmits a determination result of the mounting state determiner to the information processing apparatus, and the information processing apparatus has a takeoff controller (e.g., a takeoff controller 45a) configured to determine whether to permit takeoff of the flight equipment, based on the determination result of the mounting state determiner. This feature also allows the information processing apparatus to prohibit flight of the flight equipment having the protective member supported in the unsuitable support state. Thus, protection of the aerial vehicle can be ensured.

A flight system according to another embodiment of the present invention includes: flight equipment (e.g., flight equipment 1b); and an information processing apparatus (e.g., an information processing apparatus 5b) configured to wirelessly communicate with the fight equipment and to control flight of the flight equipment, wherein the flight equipment has: an aerial vehicle (e.g., a drone 2) having a body and at least one rotor held on the body; a plurality of supporters (e.g., supporters 4) mounted to the aerial vehicle and supporting a protective member stretched therebetween so as to surround an outside of the body; and a support information detection unit (e.g., strain sensors 41 and detection circuits 42) configured to detect support information indicating a support state of the protective member, and the information processing apparatus has a mounting state determiner (e.g., a mounting state determiner 43b) configured to determine whether the support state of the protective member is suitable or unsuitable, based on the support information. With this feature, the information processing apparatus can determine whether the protective member is supported in the suitable or unsuitable support state. Thus, when used, the flight equipment can have the protective member reliably mounted thereto.

An information processing apparatus (e.g., an information processing apparatus 5b) according to an embodiment of the present invention is intended for controlling flight equipment (e.g., flight equipment 1b) including an aerial vehicle having a body and at least one rotor held on the body, and including a plurality of supporters mounted to the aerial vehicle and supporting a protective member stretched therebetween so as to surround an outside of the body. The information processing apparatus comprising: a support information acquisition unit (e.g., remote communication unit 47) configured to acquire support information indicating a support state of the protective member; and a mounting state determiner (e.g., a mounting state determiner 43*b*) configured to determine whether the support state of the protective member is suitable or unsuitable, based on the support information acquired by the support information acquisition unit. This feature makes it possible to check the support state of the protective member and to ensure the protective member is suitably mounted to the aerial vehicle when the flight vehicle flies.

EXPLANATION OF REFERENCE NUMERALS

1, 1*a*, 1*b*: Flight Equipment
2: Drone (Aerial vehicle)
3: Protective member
4: Supporter
5, 5*a*, 5*b*: Information Processing Apparatus
21: Fastenable Part
22: Extension Part
23: Holder Part
41, 41*a*: Strain Sensor
42, 42*a*: Detection Circuit
43, 43*a*, 43*b*: Mounting State Determiner
44, 44*a*, 44*b*: Annunciator
45, 45*a*, 45*b*: Takeoff Controller

The invention claimed is:

1. Flight equipment comprising:
an aerial vehicle having a body and at least one rotor held on the body;
a plurality of support structures mounted to the aerial vehicle and configured to support a protective member stretched therebetween so as to surround an outside of the body and the at least one rotor;
a support information detection circuitry configured to detect support information indicating a support state of the protective member; and
mounting state determination circuitry configured to determine whether the support state of the protective member is suitable or unsuitable, based on the support information.

2. The flight equipment according to claim 1, wherein the support information detection circuitry comprises a sensor applied to the protective member.

3. The flight equipment according to claim 2, wherein the sensor comprises a strain sensor configured to detect deformation of one of the plurality of support structures.

4. The flight equipment according to claim 3, wherein one of the plurality of support structures comprises:
a fastenable structure mounted to the aerial vehicle and extending substantially perpendicularly to a rotation axis of the at least one rotor; and
an extension structure attached to a distal end portion of the fastenable structure and extending substantially parallel to the rotation axis of the at least one rotor, and
the strain sensor is arranged on the extension structure.

5. The flight equipment according to claim 3, wherein the strain sensor comprises a plurality of strain sensors that are arranged on the plurality of support structures on a one-to-one basis.

6. The flight equipment according to claim 5, wherein the mounting state determination circuitry is further configured to determine that the support state of the protective member is unsuitable when a difference between a maximum and a minimum of values detected by the support information detection circuitry exceeds a preset threshold.

7. The flight equipment according to claim 1, wherein the mounting state determination circuitry is arranged on the plurality of support structures.

8. The flight equipment according to claim 1, further comprising:
an annunciator configured to announce information corresponding to a determination result of the mounting state determination circuitry.

9. The flight equipment according to claim 8, wherein the annunciator is configured to announce the information such that it is identifiable which of the plurality of support structures supports the protective member in the unsuitable support state.

10. The flight equipment according to claim 1, further comprising:
a takeoff controller configured to determine whether to permit takeoff of the flight equipment, based on a determination result of the mounting state determination circuitry.

11. A flight system comprising:
the flight equipment according to claim 10; and an information processing apparatus configured to wirelessly communicate with the flight equipment and to control flight of the flight equipment, wherein
the aerial vehicle transmits a determination result of the takeoff controller to the information processing apparatus.

12. A flight system comprising:
the flight equipment according to claim 1; and an information processing apparatus configured to wirelessly communicate with the flight equipment and to control flight of the flight equipment, wherein
the aerial vehicle transmits a determination result of the mounting state determination circuitry to the information processing apparatus.

13. A flight system comprising:
the flight equipment according to claim 1; and an information processing apparatus configured to wirelessly communicate with the flight equipment and to control flight of the flight equipment, wherein
the aerial vehicle transmits a determination result of the mounting state determination circuitry to the information processing apparatus, and
the information processing apparatus has a takeoff controller configured to determine whether to permit takeoff of the flight equipment, based on the determination result of the mounting state determination circuitry.

14. A flight system comprising:
flight equipment; and an information processing apparatus configured to wirelessly communicates with the flight equipment and to control flight of the flight equipment, wherein
the flight equipment has:
an aerial vehicle having a body and at least one rotor held on the body;
a plurality of support structures mounted to the aerial vehicle and supporting a protective member stretched therebetween so as to surround an outside of the body and the at least one rotor; and support information detection circuitry configured to detect support information indicating a support state of the protective member, and the information processing apparatus comprises mounting state determination circuitry configured to determine whether the support state of the protective member is suitable or unsuitable, based on the support information.

15. An information processing apparatus for controlling flight equipment including an aerial vehicle having a body and at least one rotor held on the body, and including a plurality of support structures mounted to the aerial vehicle and supporting a protective member stretched therebetween so as to surround an outside of the body and the at least one rotor, the information processing apparatus comprising:

support information acquisition circuitry configured to acquire support information indicating a support state of the protective member; and mounting state determination circuitry configured to determine whether the support state of the protective member is suitable or unsuitable, based on the support information acquired by the support information acquisition unit.

16. The flight equipment according to claim 1, wherein the at least one rotor comprises a first rotor, a first support structure of the plurality of support structures comprises:

a fastenable structure mounted to the aerial vehicle and extending substantially perpendicularly to a rotation axis of the first rotor, and an extension structure attached to a distal end portion of the fastenable structure and extending substantially parallel to the rotation axis of the first rotor, and a strain sensor of the support information detection circuitry is arranged on the extension structure.

17. The flight equipment according to claim 1, wherein the at least one rotor comprises a first rotor, a first support structure of the plurality of support structures is mounted to the aerial vehicle and extends substantially perpendicularly to a rotation axis of the first rotor, and a strain sensor of the support information detection circuitry is arranged on a distal end of the first support structure.

* * * * *